UNITED STATES PATENT OFFICE.

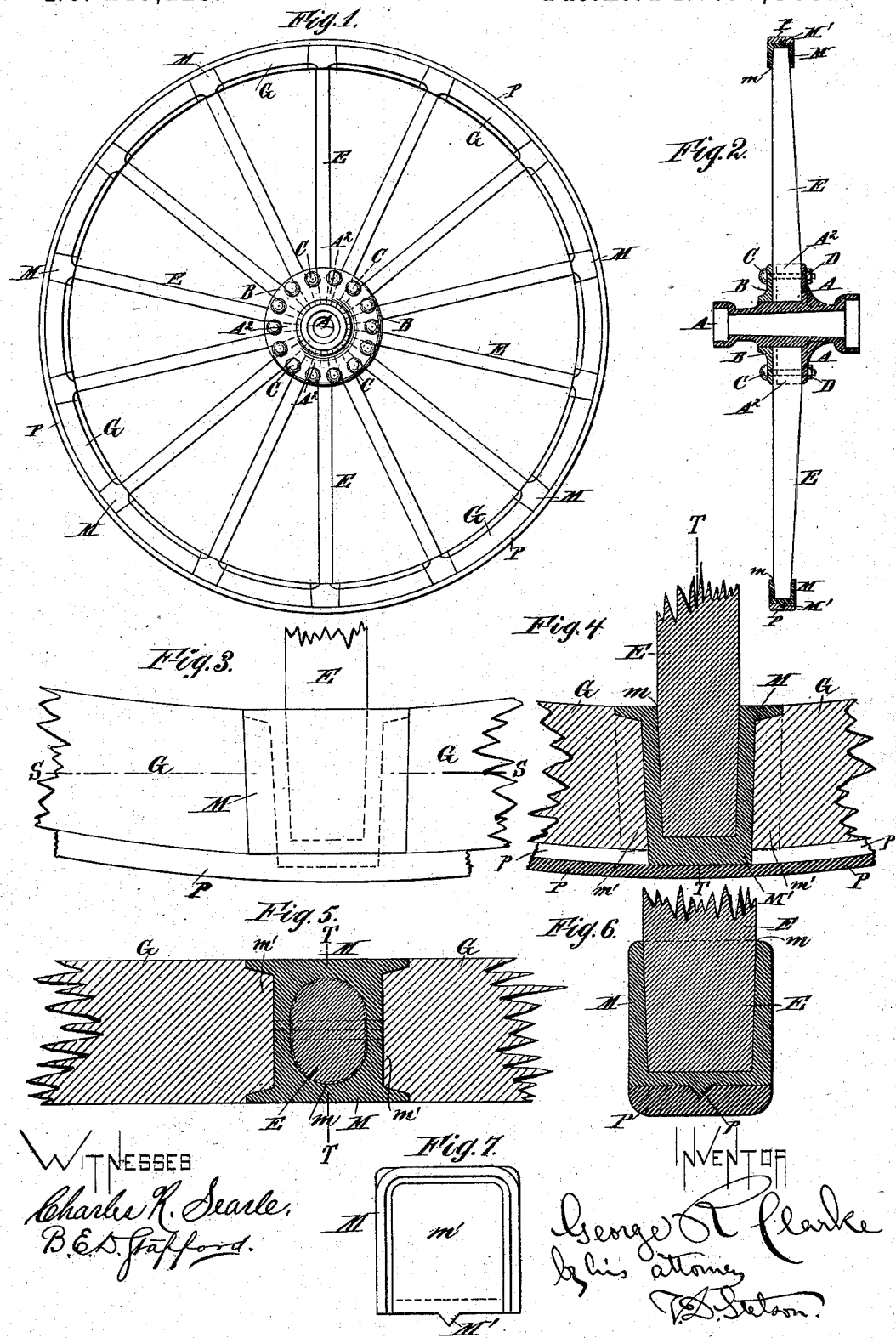

GEORGE R. CLARKE, OF FORT CLARK, TEXAS, ASSIGNOR TO HIMSELF AND SAMUEL B. M. YOUNG AND RICHARD S. KINNEY, BOTH OF SAME PLACE.

CARRIAGE-WHEEL.

SPECIFICATION forming part of Letters Patent No. 249,223, dated November 8, 1881.

Application filed August 24, 1881. (No model.)

*To all whom it may concern:*

Be it known that I, GEORGE R. CLARKE, residing at Fort Clark, Kinney county, in the State of Texas, have invented certain new and useful Improvements relating to Carriage-Wheels, of which the following is a specification.

The nature of my invention consists in so constructing a carriage-wheel that the members thereof may be made interchangeable, and the whole may be made at a factory and shipped thence "knocked down," to be assembled and put together at any point to which the same may be shipped, not requiring, as is usual, the aid of a blacksmith or other skilled labor, nor requiring that the tire should be heated and shrunk on. I provide metallic boxes, which may be either malleable iron castings or drop-forgings of iron or steel, which form the junctions between the ends of the spokes and the fellies, and also serve as a means of effectually securing the tire. I unite the several spokes at the center by a metallic hub peculiarly formed and applied.

The accompanying drawings form a part of this specification, and represent what I consider the best means of carrying out the invention.

Figure 1 is a face view of my improved wheel. Fig. 2 is a section through the same. The remaining figures are on a larger scale. Fig. 3 is a view showing the connection of a spoke with the adjoining fellies. Fig. 4 is a similar view in section. Fig. 5 is a section on the line S S in Fig. 3. Fig. 6 is a section on the line T T in Figs. 4 and 5, and Fig. 7 is a side elevation of one of the metallic boxes.

Similar letters of reference indicate like parts in all the figures.

A is the main body of the hub, and A' a broad flange thereon.

B is a follower, fitting tightly on the hub.

C C are bolts, and D D are nuts.

E E, &c., are spokes, which may be of hickory or other suitable wood.

G G are fellies, arranged to form, respectively, the portions of the rim of the wheel between the ends of the several spokes. The fellies are something less in length than their respective proportion of the wheel-rim, the remainder of the periphery being occupied by the metal box now to be described.

The boxes are all similar each to the other. A description of one will suffice for the whole.

M is the box, a certain portion being designated, when necessary, by an additional mark, M'. A capacious cavity, $m$, is formed in the box, open in the inside to receive the tenon of the corresponding spoke E and fit accurately and tightly thereon. The width of the box is exactly that of the wheel-rim. The depth is a little greater than the wooden portion of the wheel-rim, so that while the inner side of the box is flush with the wheel-rim the outer side or face presented toward the tire extends farther in the middle, that portion being in the form of a V-shaped ridge, M'. This ridge engages in a corresponding groove, $p$, in the tire P, and is of sufficient width to afford proper strength, and of sufficient height to prevent the tire from coming off in the event of the wheel-rim becoming smaller by the shrinkage of the wood, thus serving as a means of reliably securing the tire to the wheel at the end of each spoke, and consequently at each junction of the respective fellies. The two faces of the box M which are presented at each side of the wheel-rim are plane. The two faces of the box M which are presented to receive the ends of the fellies are recessed, as indicated by $m'$, slightly beveled. The ends of the fellies are reduced by hand or by machinery so as to match therein.

When it is necessary to remove one or more of the parts, the nuts D D are slackened, the bolts C C removed, the follower B taken off, and the hub A withdrawn. It now becomes possible to loosen the rim by drawing one or more of the spokes E E with its corresponding box M radially inward. This will loosen the whole rim, and new pieces, whether spokes or fellies, may be inserted. If none of the pieces are broken, but the rim has become smaller by the shrinkage of the fellies, small strips of leather, sheet metal, or other suitable material may be placed at the bottom of the recesses $m'$ in the boxes M for the ends of the fellies to abut against, and thus enlarge the circumference of the wheel-rim, so that it shall exactly fill the tire. The whole is then again put together and bolted, when the wheel is once more in condition for efficient service. The boxes M, being of the same width as the other portions of the rim of the wheel, allow the wheel to work with smoothness against the side of a plank, rail-track, or other object. The flanges or rims at the sides and inner edges of the felly ends guard the wood against splitting, and, with reasonable precautions against expansion and contraction, make an unusually strong, stiff, and durable wheel, adapted for all contingencies.

The length of the fellies should be such as to abut strongly with the ends of the grain against the bottoms of the shallow cavities $m$ $m'$. In heavy work they take the strain archwise, and there is only the yielding due to the elastic nature of the material. The wood of the fellies, as also of the spokes, should be of good quality and soaked in hot linseed-oil until the pores are nearly or quite filled therewith.

The parts are formed at the center for making a corresponding tight and strong union with the inner ends of the respective spokes. The inner ends of the spokes are received between the triangular partitions $A^2$, and abut fairly against the body of the hub A. Two faces of the inner end of each spoke are received between and make a more or less tight contact against the respective triangular shapes $A^2$, which form a part of the tub. Of the remaining two faces one is pressed fairly against the flange A'. The other is correspondingly pressed against by the follower B.

The bolts C should be made as large as the spaces between the inner ends of the spokes will allow. The holes for these bolts practically separate the triangular shapes $A^2$. In other words, the triangular parts $A^2$ are composed of a thick wedge-shaped mass of iron or steel, exterior to the bolt C, and a thinner one interior thereto.

In order to get the proper tension on the wheel when putting the same together, I use a suitable platform, made very firm and large enough to receive the tire. (Another wheel will do, in case of emergency.) Through the center of this platform is passed a large bolt, long enough to reach through the hub, and adapted to receive a heavy washer-nut. The tire, fellies, and spokes rest on supports, with the face or dish side of the wheel downward. The hub is dropped through the space at the inner ends of the spokes, the follower B put on, and the bolts C C inserted in place, and the nuts D D all screwed to their place. Now, if the nut on the large bolt that goes through the hub and platform is screwed down, it is obvious that a tension can be put on to any extent up to the point of breakage. When the proper tension is reached the nuts D D are screwed home, and it is obvious that the wheel is as solid as if the tire had been heated and shrunk on.

Modifications may be made in the forms and proportions. There may be a greater or less number of spokes, with a corresponding change in the number of fellies and of all the other members of the wheel. The spokes may be round or of elliptic section throughout, except at the extreme inner ends; or they may be largely rectangular. The groove $p$ in the tire P may be continuous around the entire circumference of the tire, or merely sunk at places equaling the number of spokes, and it may be of any shape or merely countersunk holes, in any case it being understood that the shape of the ridge M' on the boxes M is changed to correspond. There may also be a corresponding ridge on the fellies to fit the groove $p$ in the tire. The length of the hub and the size of the respective enlargements at each end for the washers, &c., on the axle (not represented) may obviously be varied. The triangular partitions $A^2$ may be omitted, if desirable, in manufacturing less expensive wheels. Some parts of the invention may be made without the whole.

I claim as my invention—

1. The combination of the boxes M, having the V-shaped ridge M' on their outer face, the cavities $m'$, for receiving the fellies, and the socket $m$, for receiving the spokes, with the tire P, having the inclined groove $p$, fellies G, and spokes E, substantially as set forth.

2. A wheel for vehicles, having the boxes M $m$ $m'$, fellies G, held in place by the boxes at both ends, the spoke E, and the hub A B, all combined and arranged relatively to each other and to an inclosing-tire so as, upon removing the portion B of the hub, the remainder of the wheel can be readily taken apart, as set forth.

In testimony whereof I have hereunto set my hand, at Brackett, this 16th day of August, 1881, in the presence of two subscribing witnesses.

GEO. R. CLARKE.

Witnesses:
R. S. KINNEY,
J. HYLAND.